(12) United States Patent
Rastunkov et al.

(10) Patent No.: US 12,555,046 B2
(45) Date of Patent: Feb. 17, 2026

(54) QUANTUM MACHINE LEARNING MODEL FEATURE SPACE GENERATION

(71) Applicant: International Business Machines Corporation, Armonk, NY (US)

(72) Inventors: Vladimir Rastunkov, Mundelein, IL (US); Jae-Eun Park, Wappingers Falls, NY (US); Abhijit Mitra, The Woodlands, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1277 days.

(21) Appl. No.: 17/353,268

(22) Filed: Jun. 21, 2021

(65) Prior Publication Data

US 2022/0405649 A1 Dec. 22, 2022

(51) Int. Cl.
*G06N 20/20* (2019.01)
*G06F 11/34* (2006.01)
*G06F 18/214* (2023.01)
*G06N 10/00* (2022.01)

(52) U.S. Cl.
CPC ......... *G06N 20/20* (2019.01); *G06F 11/3428* (2013.01); *G06F 18/2148* (2023.01); *G06N 10/00* (2019.01)

(58) Field of Classification Search
None
See application file for complete search history.

(56) References Cited

U.S. PATENT DOCUMENTS

| | | | |
|---|---|---|---|
| 10,275,721 B2 * | 4/2019 | Dukatz | G06N 20/00 |
| 10,318,881 B2 | 6/2019 | Rose et al. | |
| 10,339,466 B1 | 7/2019 | Ding et al. | |
| 10,540,704 B2 | 1/2020 | Mazed et al. | |
| 10,977,546 B2 | 4/2021 | Gambetta et al. | |
| 11,748,665 B2 * | 9/2023 | Gambetta | G06N 10/60 |
| | | | 706/12 |
| 2018/0247200 A1 | 8/2018 | Rolfe | |
| 2020/0118025 A1 | 4/2020 | Romero et al. | |
| 2020/0210876 A1 | 7/2020 | Rolfe et al. | |

(Continued)

OTHER PUBLICATIONS

Arunachalam et al., Quantum Boosting; arXiv:2002.05056v1 [quant-ph] Feb. 12, 2020; pp. 1-37 (Year: 2020).*

(Continued)

*Primary Examiner* — Alan Chen
(74) *Attorney, Agent, or Firm* — Amin, Turocy & Watson, LLP

(57) ABSTRACT

Techniques regarding generating an ensemble of quantum kernel-based learners for one or more quantum machine learning models are provided. For example, one or more embodiments described herein can comprise a system, which can comprise a memory that can store computer executable components. The system can also comprise a processor, operably coupled to the memory, and that can execute the computer executable components stored in the memory. The computer executable components can comprise an ensemble component that can generate an ensemble of quantum kernel-based learners by selecting a quantum kernel at multiple iterations of a boosting procedure that analyzes a range of feature maps employable by a quantum machine learning model.

20 Claims, 12 Drawing Sheets

(56) References Cited

U.S. PATENT DOCUMENTS

2020/0401916 A1 12/2020 Rolfe et al.
2021/0019647 A1 1/2021 Macready et al.

OTHER PUBLICATIONS

Huang et al., Superconducting quantum computing: a review; Science China, Information Sciences, Aug. 2020, vol. 63; https://doi.org/10.1007/s11432-020-2881-9; Total Pages: 32 (Year: 2020).*
Izdebski et al., Improved Quantum Boosting; arXiv:2009.08360v1 [quant-ph] Sep. 17, 2020; pp. 1-16 (Year: 2020).*
Abbas, A., Schuld, M., & Petruccione, F. (2020). On quantum ensembles of quantum classifiers. arXiv:2001.10833.
Breiman, L. (2001). Random Forests. Machine Learning, 45, 5-32.
Freund, Y., & Schapire, R. E. (1996). Experiments with a New Boosting Algorithm. Machine Learning: Proceedings of the Thirteenth International Conference.
Hastie, T., Tibshirani, R., & Friedman, J. (2017). The elements of statistical learning: data mining, inference and prediction. Springer.
Havlicek, V., Corcoles, A. D., Temme, K., Harrow, A. W., Kandala, A., Chow, J. M., & Gambetta, J. M. (2018). Supervised learning with quantum enhanced feature spaces. arXiv:1804.11326.
Neven, H., Denchev, V. S., Rose, G., & Macready, W. G. (2009). Training a Large Scale Classifier with the Quantum Adiabatic Algorithm. arXiv:0912.0779.
Park, J.-E., Quanz, B., Wood, S., Higgins, H., & Harishankar, R. (2020). Practical application improvement to Quantum SVM: theory to practice. arXiv:2012.07725.
Rebentrost, P., Mohseni, M., & Lloyd, S. (2014). Quantum Support Vector Machine for Big Data Classification. Physical Review Letters(113), 130503.
Russell, S., & Norvig, P. (2021). Artificial Intelligence: A Modern Approach. Fourth Edition. Pearson, pp. 1-644.
Russell, S., & Norvig, P. (2021). Artificial Intelligence: A Modern Approach. Fourth Edition. Pearson, pp. 645-1289.
Russell, S., & Norvig, P. (2021). Artificial Intelligence: A Modern Approach. Fourth Edition. Pearson, pp. 1290-1933.
Russell, S., & Norvig, P. (2021). Artificial Intelligence: A Modern Approach. Fourth Edition. Pearson, pp. 1934-2581.
Schuld, M. (2021). Quantum machine learning models are kernel methods. arXiv:2101.11020.
Schuld, M., & Petruccione, F. (2017). Quantum ensembles of quantum classifiers. arXiv:1704.02146.
Mell, et al., "The NIST Definition of Cloud Computing," Special Publication 800-145, Sep. 2011, 7 pages.

* cited by examiner

700

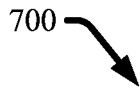

---

Algorithm 1

Input $X_{train}, y_{train}, y_{train,i} \in \{0,1\}, M, \alpha \in \{\alpha_j\}$ Pauli set $\in \{X, Y, Z, XX, XY, XZ, YY, YZ, ZZ\}$

Output $G(x)$

1: Initialize $\tilde{X}_{train} = X_{train}, \tilde{y}_{train} = y_{train}$

2: for $m = 1$ to $M$ do

3:     Fit classifiers $G_{m,j}(x)$ to the $(\tilde{X}_{train}, \tilde{y}_{train})$ with different Pauli matrices and $\alpha$ 4:     Choose the best classifier $G_m(x)$ based on $(X_{test}, y_{test})$ performance, remove the winner's Pauli matrix from the set 5:     Compute $err_m = \sum_{i=1}^{N} I(\tilde{y}_{train,i} \neq G_m(\tilde{X}_{train,i}))$ (estimator error)

6:     Compute $\alpha_m = \log((1 - err_m)/err_m)$ (estimator weight)

7:     Set $w_i \leftarrow \exp[\alpha_m \cdot I(\tilde{y}_{train,i} \neq G_m(\tilde{X}_{train,i}))]$ 8:     Sample $X_{train}, y_{train}$ with weights $\{w_i\} \rightarrow \tilde{X}_{train}, \tilde{y}_{train}$ 9: Output $G(x) = \sum_{m=1}^{M} (\alpha_m G_m(x)) / \sum_{m=1}^{M} (\alpha_m)$

FIG. 7

QUANTUM MACHINE LEARNING MODEL FEATURE SPACE GENERATION

BACKGROUND

The subject disclosure relates to the feature space generation in quantum machine learning models, and more specifically, to the use of one or more boosting procedure to generate an ensemble of quantum kernel-based learners that explore a range of feature maps employable by one or more quantum machine learning models.

Decision support systems across different industries rely on predictive models trained on historical data. The models can be trained to increase the accuracy of predictions, retain stable performance over time, and/or utilize fewer features possible by efficiently extracting information from available data. Typical models can be generated by classical, non-quantum, computers. To leverage data processing advantages of quantum computers, quantum machine learning models have been proposed, which can exploit a high-dimensional quantum Hilbert space.

However, unlike other types of machine learning algorithms, the choice of an initial feature map in a quantum machine learning model can yield quite unique decision boundaries. For example, quantum machine learning models with different initial feature maps, but otherwise identical parameters, can be independent from each other. Additionally, quantum machine learning model architectures are often derived from physical models (e.g. Ising model and respective Hamiltonian were used for feature mapping). Thereby, feature space discovery can typically require an expertise in physics to navigate the complexity of the architectures.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatuses and/or computer program products that can generate an ensemble of quantum kernel-based learners for feature space generation in a quantum machine learning model are described.

According to an embodiment, a system is provided. The system can comprise a memory that stores computer executable components. The system can also comprise a processor, operably coupled to the memory, and that executes the computer executable components stored in the memory. The computer-executable components can comprise an ensemble component that can generate an ensemble of quantum kernel-based learners by selecting a quantum kernel at multiple iterations of a boosting procedure that analyzes a range of feature maps employable by a quantum machine learning model. An advantage of such a system can be the exploration of wide feature spaces for implementing the quantum machine learning model.

In some examples, the ensemble of quantum kernel-based learners can comprise a plurality of quantum kernel-based learners executable on superconducting qubits. An advantage of such a system can be use of quantum processing afforded by a quantum processor.

According to an embodiment, a computer-implemented method is provided. The computer-implemented method can comprise generating, by a system operatively coupled to a processor, an ensemble of quantum kernel-based learners by selecting a quantum kernel at multiple iterations of a boosting procedure that analyzes a range of feature maps employable by a quantum machine learning model. An advantage of such a computer-implemented method can be the automated development of quantum kernels for quantum machine learning models.

In some examples, the computer-implemented method can further comprise training, by the system, a set of quantum kernel-based learners on a training dataset for a plurality of quantum kernels. The plurality of quantum kernels can define permutations of the range of feature maps and Pauli rotation factors. Additionally, the computer-implemented method can comprise generating, by the system, a performance metric associated with execution of the set of quantum kernel-based learners on a testing dataset. An advantage of such a computer-implemented method can be identification and/or selection of quantum kernels that best achieve a desired performance metric.

According to an embodiment, a computer program product for developing a feature space of a quantum machine learning model is provided. The computer program product can comprise a computer readable storage medium having program instructions embodied therewith. The program instructions can be executable by a processor to cause the processor to generate, by the processor, an ensemble of quantum kernel-based learners by selecting a quantum kernel at multiple iterations of a boosting procedure that analyzes a range of feature maps employable by the quantum machine learning model. An advantage of such a computer program product can be the use of quantum circuits for kernel functions, which can employ greater enhanced data processing as compared to circuits typically used in boosting procedures of classical computers.

In some examples, the program instructions can further cause the processor to train, by the processor, a set of quantum kernel-based learners on a training dataset for a plurality of quantum kernels. The plurality of quantum kernels can define permutations of the range of feature maps and Pauli rotation factors. Also, the program instructions can further cause the processor to generate, by the processor, a performance metric associated with execution of the set of quantum kernel-based learners on a testing dataset. Additionally, the program instructions can further cause the processor to generate, by the processor, a modified plurality of quantum kernels by removing the first quantum kernel from the plurality of quantum kernels based on the first iteration. Also, second quantum kernel can be selected from the modified plurality of quantum kernels at a second iteration of the boosting procedure. An advantage of such a computer program product can be the development of a feature space for quantum machine learning models that can execute classification and/or regression tasks.

BRIEF DESCRIPTION OF THE DRAWINGS

FIG. 7 illustrates a diagram of an example, non-limiting algorithm that can characterize the generation of an ensemble of quantum kernel-based learners for generating a feature space of one or more quantum machine learning models in accordance with one or more embodiments described herein.

DETAILED DESCRIPTION

Figure 1:
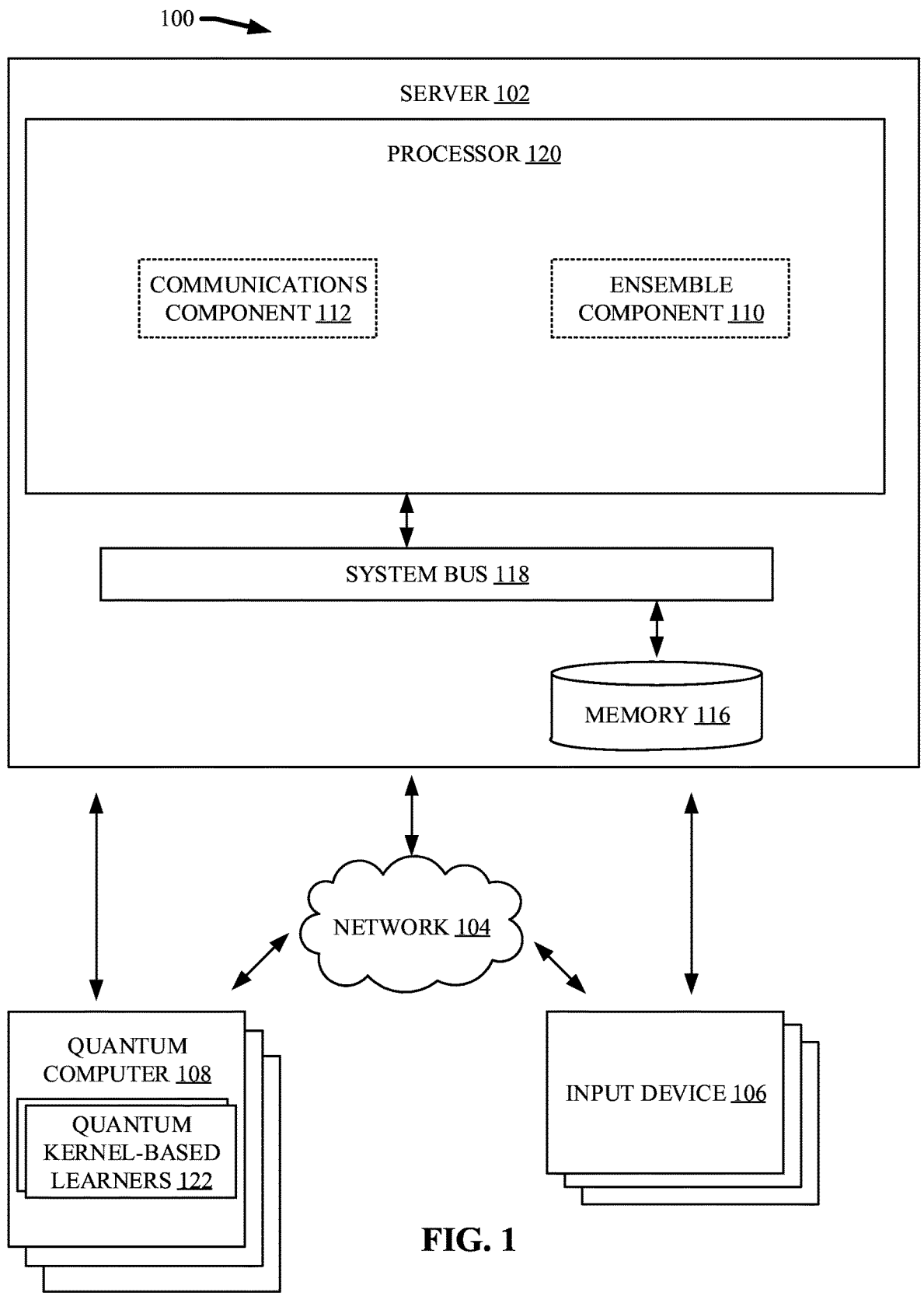
FIG. 1 illustrates a block diagram of an example, non-limiting system that can generate an ensemble of quantum kernel-based learners for generating a feature space of one or more quantum machine learning models in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Given the problems with other implementations of feature space discovery; the present disclosure can be implemented to produce a solution to one or more of these problems by employing a boosting procedure to generate a feature space for one or more quantum machine learning models. As used herein, the term "boosting procedure" can refer to an ensemble method that creates a strong learner (e.g., classifier) from a number of weak learners (e.g., weaker classifiers) by building an initial model from training data and building another model that seeks to correct errors from the initial model. Advantageously, one or more embodiments described herein can explore a wide range of feature maps by modifying the quantum kernel search parameters with each iteration of the boosting procedure. For example, a quantum kernel can be selected with each iteration of the boosting procedure. Based on the selected quantum kernels, an ensemble of quantum kernel-based learners can be generated to employ one or more quantum machine learning model to execute one or more machine learning tasks (e.g., classification and/or regression tasks). As used herein, the term "learners" can generally refer to machine learning algorithms.

Various embodiments of the present invention can be directed to computer processing systems, computer-implemented methods, apparatus and/or computer program products that facilitate the efficient, effective, and autonomous (e.g., without direct human guidance) generation of an ensemble of quantum kernel-based learners for one or more quantum machine learning models. For example, in one or more embodiments described herein can regard an automated process for selecting quantum kernels using training and/or testing datasets with each iteration of a boosting procedure. Additionally, various embodiments described herein can modify a grid for the quantum kernel search for subsequent iterations of the boosting procedure by excluding previously selected search parameters (e.g., excluding previously selected quantum kernels). For example, error weights of observations in the training dataset can be calculated based on model error incurred in previous iterations of the boosting process and passed to subsequent iterations. Further, learner weights associated with the performance of the quantum kernel-based learners achieved in previous iterations of the boosting procedure can be calculated and employed to generate an ensemble of quantum kernel-based learners.

The computer processing systems, computer-implemented methods, apparatus and/or computer program products employ hardware and/or software to solve problems that are highly technical in nature (e.g., feature space generation for quantum machine learning models), that are not abstract and cannot be performed as a set of mental acts by a human. For example, an individual, or a plurality of individuals, cannot exploit properties of quantum computing (e.g., quantum entanglement) to explore feature spaces employable by one or more quantum machine learning models.

Also, one or more embodiments described herein can constitute a technical improvement over conventional quantum machine learning models by generating feature spaces via a boosting procedure that can facilitate the generation of an ensemble of quantum kernel-based learners. Further, one or more embodiments described herein can have a practical application by generating feature spaces for quantum machine learning models that can be employed to execute a variety of machine learning tasks. For instance, various embodiments described herein can generate an ensemble of quantum kernel-based learners that can be employed by one or more machine learning models to execute classification and/or regression tasks. One or more embodiments described herein can control quantum circuits (e.g., comprising one or more superconducting qubits) to train one or more quantum kernel-based learners with a range of feature maps on a training dataset.

FIG. 1 illustrates a block diagram of an example, non-limiting system 100 that can generate an ensemble of quantum kernel-based learners that utilize a feature space that explore a wide range of feature maps to execute one or more quantum machine learning models. Repetitive description of like elements employed in other embodiments described herein is omitted for the sake of brevity. Aspects of systems (e.g., system 100 and the like), apparatuses or processes in various embodiments of the present invention can constitute one or more machine-executable components embodied within one or more machines, e.g., embodied in one or more computer readable mediums (or media) associated with one or more machines. Such components, when executed by the one or more machines (e.g., computers, computing devices, virtual machines, a combination thereof, and/or the like) can cause the machines to perform the operations described.

As used herein, the term "machine learning task" can refer to an application of artificial intelligence technologies to automatically and/or autonomously learn and/or improve from an experience (e.g., training data) without explicit programming of the lesson learned and/or improved. For example, machine learning tasks can utilize one or more algorithms to facilitate supervised and/or unsupervised learning to perform tasks such as classification, regression, and/or clustering. Execution of a machine learning task can be facilitated by one or more machine learning models trained on one or more datasets in accordance with one or more model configuration settings.

As used herein, the term "quantum machine learning model" can refer to a quantum computer model that can be used to facilitate one or more machine learning tasks. In various examples, quantum machine learning models can simulate a number of interconnected processing units that can resemble abstract versions of neurons. For example, the processing units can be arranged in a plurality of layers (e.g., one or more input layers, one or more hidden layers, and/or one or more output layers) connected with by varying connection strengths (e.g., which can be commonly referred to within the art as "weights"). Quantum machine learning models can learn through training, where data with known outcomes is inputted into the model, outputs regarding the data are compared to the known outcomes, and/or the weights of the computer model are autonomous adjusted based on the comparison to replicate the known outcomes. As used herein, the term "training dataset" can refer to data and/or datasets used to train one or more quantum machine learning models. As a quantum machine learning model trains (e.g., utilizes more training data), the model can become increasingly accurate; thus, trained quantum machine learning models can accurately analyze data with unknown outcomes, based on lessons learning from training data, to facilitate one or more machine learning tasks. Example quantum machine learning models can include, but are not limited to: quantum neural networks, quantum support vector machines, classical algorithms operating with quantum kernels (e.g., principal component analysis, kernel fisher discriminant, kernel k-means, principal least squares, regression, and/or the like), a combination thereof, and/or the like.

As shown in FIG. 1, the system 100 can comprise one or more servers 102, one or more networks 104, input devices 106, and/or quantum computers 108. The server 102 can comprise ensemble component 110. The server 102 can further comprise communications component 112. Also, the server 102 can comprise or otherwise be associated with at least one memory 116. The server 102 can further comprise a system bus 118 that can couple to various components such as, but not limited to, the ensemble component 110 and associated components, memory 116 and/or a processor 120. While a server 102 is illustrated in FIG. 1, in other embodiments, multiple devices of various types can be associated with or comprise the features shown in FIG. 1. Further, the server 102 can communicate with one or more cloud computing environments.

The one or more networks 104 can comprise wired and wireless networks, including, but not limited to, a cellular network, a wide area network (WAN) (e.g., the Internet) or a local area network (LAN). For example, the server 102 can communicate with the one or more input devices 106 and/or quantum computers 108 (and vice versa) using virtually any desired wired or wireless technology including for example, but not limited to: cellular, WAN, wireless fidelity (Wi-Fi), Wi-Max, WLAN, Bluetooth technology, a combination thereof, and/or the like. Further, although in the embodiment shown the ensemble component 110 can be provided on the one or more servers 102, it should be appreciated that the architecture of system 100 is not so limited. For example, the ensemble component 110, or one or more components of ensemble component 110, can be located at another computer device, such as another server device, a client device, and/or the like.

The one or more input devices 106 can comprise one or more computerized devices, which can include, but are not limited to: personal computers, desktop computers, laptop computers, cellular telephones (e.g., smart phones), computerized tablets (e.g., comprising a processor), smart watches, keyboards, touch screens, mice, a combination thereof, and/or the like. The one or more input devices 106 can be employed to enter one or more training datasets, testing datasets, quantum machine learning model parameters, and/or settings into the system 100, thereby sharing (e.g., via a direct connection and/or via the one or more networks 104) said data with the server 102. For example, the one or more input devices 106 can send data to the communications component 112 (e.g., via a direct connection and/or via the one or more networks 104). Additionally, the one or more input devices 106 can comprise one or more displays that can present one or more outputs generated by the system 100 to a user. For example, the one or more displays can include, but are not limited to: cathode tube display ("CRT"), light-emitting diode display ("LED"), electroluminescent display ("ELD"), plasma display panel ("PDP"), liquid crystal display ("LCD"), organic light-emitting diode display ("OLED"), a combination thereof, and/or the like.

In various embodiments, the one or more input devices 106 and/or the one or more networks 104 can be employed to input one or more settings and/or commands into the system 100. For example, in the various embodiments described herein, the one or more input devices 106 can be employed to operate and/or manipulate the server 102 and/or associate components to drive the one or more quantum computers 108. Additionally, the one or more input devices 106 can be employed to display one or more outputs (e.g., displays, data, visualizations, and/or the like) generated by the server 102, associate components, and/or quantum computers 108. Further, in one or more embodiments, the one or more input devices 106 can be comprised within, and/or operably coupled to, a cloud computing environment.

In various embodiments, the one or more quantum computers 108 can comprise quantum hardware devices that can utilize the phenomena of quantum mechanics (e.g., such as superposition and/or quantum entanglement) to facilitate computational processing (e.g., while satisfying the DiVincenzo criteria). In one or more embodiments, the one or more quantum computers 108 can comprise a quantum data plane, a control processor plane, a control and measurement plane, and/or a qubit technology.

In one or more embodiments, the quantum data plane can include one or more quantum circuits comprising physical qubits, structures to secure the positioning of the qubits, and/or support circuitry. Physical qubits can be, for example, superconducting qubits (e.g., transmon qubits), trapped ion qubits, photonic qubits, quantum dot qubits, gate-based neutral atom qubits, semiconductor qubits (e.g., optically gated or electrically gated), a combination thereof, and/or the like. The support circuitry can, for example, facilitate measurement of the qubits' state and/or perform gate operations on the qubits (e.g., for a gate-based system). In some embodiments, the support circuitry can comprise a wiring network that can enable multiple qubits to interact with each other. Further, the wiring network can facilitate the transmission of control signals via a direct electrical connection and/or electromagnetic radiation (e.g., optical, microwave, and/or low-frequency signals). For instance, the support circuitry can comprise one or more superconducting resonators operatively coupled to the one or more qubits. As described herein the term "superconducting" can characterize a material that exhibits superconducting properties at or below a superconducting critical temperature, such as aluminum (e.g., superconducting critical temperature of 1.2 Kelvin) or niobium (e.g., superconducting critical temperature of 9.3 Kelvin). Additionally, one of ordinary skill in the art will recognize that other superconductor materials (e.g., hydride superconductors, such as lithium/magnesium hydride alloys) can be used in the various embodiments described herein.

In one or more embodiments, the control processor plane can identify and/or trigger a Hamiltonian sequence of quantum gate operations and/or measurements, wherein the sequence executes a program (e.g., provided by a host processor, such as server 102, via ensemble component 110) for implementing a quantum algorithm (e.g., defining one or more quantum machine learning models). For example, the control processor plane can convert compiled code to commands for the control and measurement plane. In one or more embodiments, the control processor plane can further execute one or more quantum error correction algorithms.

In one or more embodiments, the control and measurement plane can convert digital signals generated by the control processor plane, which can delineate quantum operations to be performed, into analog control signals to perform the operations on the one or more qubits in the quantum data plane. Also, the control and measurement plane can convert one or more analog measurement outputs of the qubits in the data plane to classical binary data that can be shared with other components of the system 100 (e.g., such as the ensemble component 110, via, for example, the control processor plane).

One of ordinary skill in the art will recognize that a variety of qubit technologies can provide the basis for the one or more qubits of the one or more quantum computers 108. Two exemplary qubit technologies can include trapped ion qubits and/or superconducting qubits. For instance, where the one or more quantum computers 108 utilizes trapped ion qubits, the quantum data plane can comprise a plurality of ions serving as qubits and one or more traps that serve to hold the ions in specific locations. Further, the control and measurement plane can include: a laser or microwave source directed at one or more of the ions to affect the ion's quantum state, a laser to cool and/or enable measurement of the ions, and/or one or more photon detectors to measure the state of the ions. In another instance, superconducting qubits (e.g., such as superconducting quantum interference devices "SQUIDs") can be lithographically defined electronic circuits that can be cooled to milli-Kelvin temperatures to exhibit quantized energy levels (e.g., due to quantized states of electronic charge or magnetic flux). Superconducting qubits can be Josephson junction-based, such as transmon qubits and/or the like. Also, superconducting qubits can be compatible with microwave control electronics, and can be utilized with gate-based technology or integrated cryogenic controls. Additional exemplary qubit technologies can include, but are not limited to: photonic qubits, quantum dot qubits, gate-based neutral atom qubits, semiconductor qubits (e.g., optically gated or electrically gated), a combination thereof, and/or the like.

In one or more embodiments, the communications component 112 can receive one or more input data (e.g., training datasets, testing datasets, quantum machine learning model parameters, model settings, quantum circuit topologies, feature maps, Pauli rotation factors, a combination thereof, and/or the like) from the one or more input devices 106 (e.g., via a direct electrical connection and/or through the one or more networks 104) and share the data with the various associate components of the ensemble component 110. Additionally, the communications component 112 can facilitate the sharing of data between the ensemble component 110 and the one or more quantum computers 108, and/or vice versa (e.g., via a direct electrical connection and/or through the one or more networks 104).

As shown in FIG. 1, the one or more quantum computers 108 can include a plurality of quantum kernel-based learners 122. In one or more embodiments, the plurality of quantum kernel-based learners 122 can employ one or more quantum algorithms to perform kernel-based machine learning. For example, the one or more quantum algorithms can utilize one or more kernel functions to map input data to a feature space. For instance, the plurality of quantum kernel-based learners 122 can generate one or more quantum machine learning models, such as quantum support vector machine ("QSVM") models and/or quantum neural network ("NN") models. In various embodiments, the plurality of quantum kernel-based learners 122 can employ kernel-based machine learning to solve one or more machine learning tasks, including, but not limited to: classification tasks (e.g., binary classification and/or multiple class classification), regression tasks, pattern recognition tasks, clustering tasks, ranking tasks, a combination thereof, and/or the like. Additionally, the plurality of quantum kernel-based learners 122 can be employed in supervised or unsupervised learning protocols. In various embodiments, the plurality of quantum kernel-based learners 122 can comprise machine learning algorithms that can encode and/or analyze data in high-dimensional Hilbert spaces, which can be accessed by measuring inner products of features, once processed by the one or more quantum computers 108.

In accordance with various embodiments described herein (e.g., with at least FIGS. 2-12), the ensemble component 110 can implement one or more boosting procedures to generate an ensemble of quantum kernel-based learners for one or more quantum machine learning models. For example, the one or more boosting procedures can comprise multiple iterations of training and testing the plurality of quantum kernel-based learners 122 on various quantum kernels, where the respective quantum kernels can define respective permutations of feature maps and Pauli rotation factors. With each iteration, a top performing quantum kernel (e.g., along with the top performing quantum kernel-based learner 122, such as a quantum classifier with regards to classification tasks) can be selected and removed from the pool of quantum kernels available for training and/or testing in subsequent iterations (e.g., where the selection can be based on exceeding the performance of other quantum kernel-based learners 122 or based on exceeding a predetermined criteria). Additionally, the quantum kernel-based learners 122 associated with the selected quantum kernels can be weighted and combined to form the ensemble of quantum kernel-based learners 122. In various embodiments, each iteration of the one or more boosting procedures can further modify the quantum kernel search by adjusting error weights associated with model results incurred by the quantum kernel-based learners 122 in previous iterations.

In various embodiments, the ensemble component 110 can control the one or more quantum kernel-based learners 122 via the one quantum computers 108. For example, the ensemble component 110 can receive input data from the one or more input devices 106 and process the input data to drive the one or more quantum kernel-based learners 122. Additionally, the ensemble component 110 can calculate cost functions, optimize training parameters, and/or control the one or more quantum computers 108 to perform feature mapping (e.g., the mapping of input data to quantum representations generated by the one or more quantum kernel-based learners 122) and/or calculate the quantum kernels.

In one or more embodiments, the one or more input devices 106 can be employed to enter the input data into the system 100. The input data can include, for example, data to be modeled by one or more quantum machine learning models generated by the quantum kernel-based learners 122 to solve one or more machine learning tasks. For instance, the input data can include one or more datasets that can be employed by the ensemble component 110, and/or associate components thereof, to train and/or test the one or more quantum kernel-based learners 122. In one or more embodiments, the ensemble component 110 can read the input data from a database, comma-separated file, cloud-based storage, and/or the like (e.g., utilizing one or more Python libraries such as Pandas, Scikit-learn, and/or the like). Further, the ensemble component 110 can process the input data to impute outliers and/or missing values. Additionally, the ensemble component 110 can one-hot encode categorical features of the input data, while continuous features can be standardized to have zero average and a standard deviation equal to one.

In various embodiments, the ensemble component 110 can further split the input data into one or more training datasets and/or testing datasets. In one or more embodiments, the ensemble component 110 can further process the input data in accordance with the requirements of one or more machine learning tasks to be completed. For example, with regards to a classification task, the ensemble component 110 can further balance the input data to equalize representation of the various classes used for the classification.

In one or more embodiments, the one or more input devices 106 can further be employed to define one or more parameters for the one or more boosting procedures. Example boosting procedure parameters that can be defined via the one or more input devices 106 can include, but are not limited to: a maximum number of quantum kernel-based learners 122 to be included in the ensemble of quantum kernel-based learners 122, one or more families of feature maps and/or quantum kernels, a range of Pauli rotation factors, data encoding strategies (e.g., basis encoding, amplitude encoding, rotation encoding, coherent state encoding, general near-term encoding, and/or the like), a combination thereof, and/or the like. In various embodiments, the ensemble component 110 can store the one or more training datasets, testing datasets, and/or boosting procedure parameters in the one or more memories 116.

Figure 2:
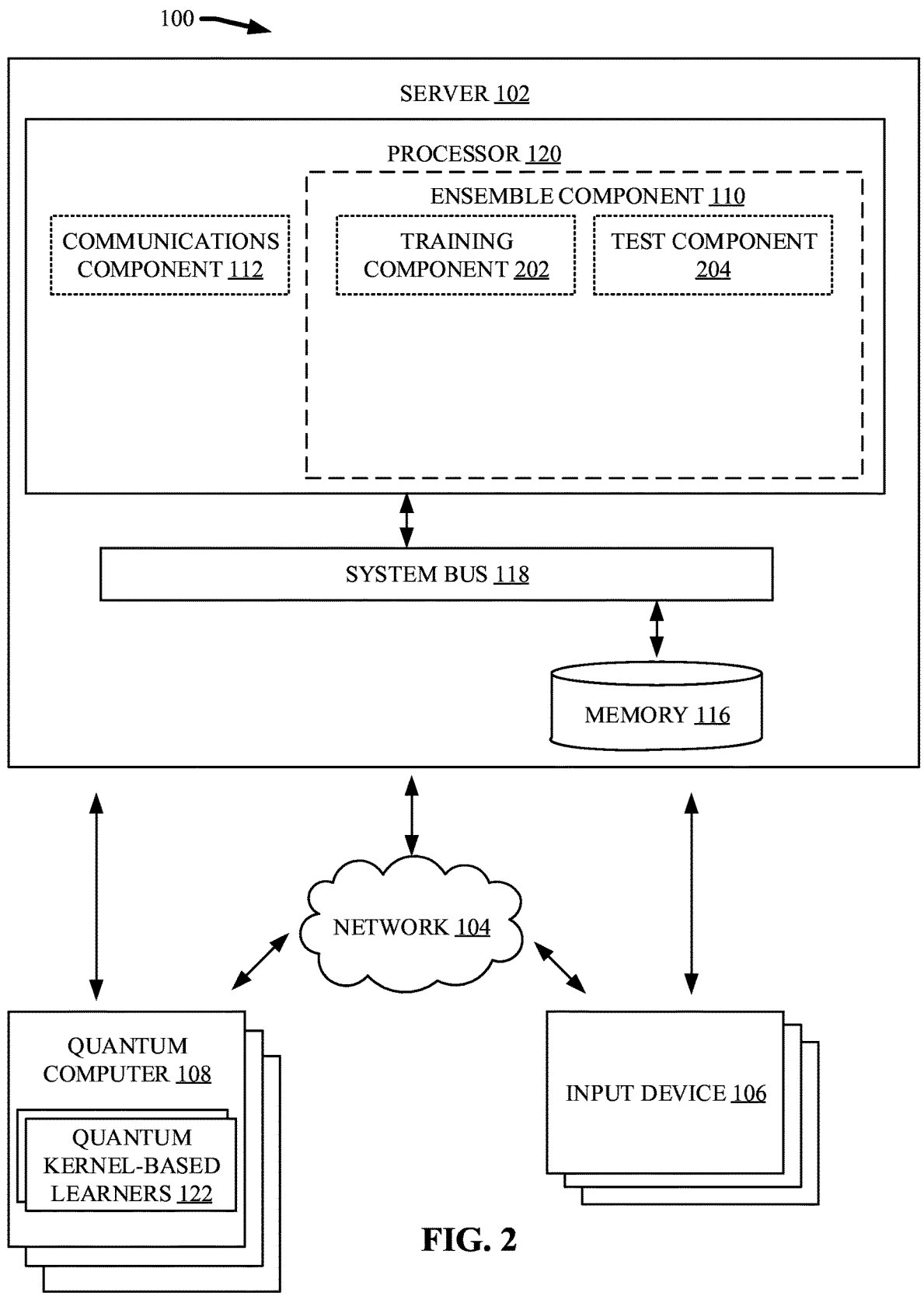
FIG. 2 illustrates a block diagram of an example, non-limiting system that can train a set of quantum kernel-based learners with a plurality of quantum kernels on a training dataset and test a performance of the trained quantum kernel-based learners on a testing dataset in accordance with one or more embodiments described herein.

FIG. 2 illustrates a diagram of the example, non-limiting system 100 further comprising training component 202 and testing component 204 in accordance with one or more embodiments described herein. Repetitive description of like elements employed in other embodiments described herein is omitted for the sake of brevity. In various embodiments, the training component 202 can train the plurality of quantum kernel-based learners 122 on the one or more training datasets for a plurality of possible quantum kernels at each iteration of the one or more boosting procedures. Additionally, the testing component 204 can test the performance of the trained plurality of quantum kernel-based learners 122 on the one or more testing datasets at each iteration of the one or more boosting procedures.

At each iteration of the boosting procedure, the training component 202 can train the plurality of quantum kernel-based learners 122 on the one or more training datasets. In the first iteration of the boosting procedure, the samples of the training datasets can be assigned a weight value. In one or more embodiments, all the samples of the training datasets can be assigned equal weight values. For example, all the samples of the training dataset can be assigned a weight value of 1 during the training performed by the training component 202 during the first iteration of the boosting procedure. With each subsequent iteration, the weighted values assigned to the samples can be adjusted in accordance with the various embodiments described herein. The training component 202 can train the plurality of quantum kernel-based learners 122 on the one or more training datasets for a plurality of quantum kernels. In one or more embodiments, during the training, the one or more quantum computers 108 can compute a kernel matrix using one or more quantum circuits employed by the plurality of quantum kernel-based learners 122 to characterize the plurality of quantum kernels. For example, a quantum kernel matrix can be calculated by measuring state overlap corresponding to all pairs of points in the training dataset.

The plurality of quantum kernels can define various permutations of feature maps and Pauli rotation factors (e.g., defined via the one or more input devices 106). Additionally, each quantum kernel-based learner 122 can employ a respective quantum kernel during the training. Thereby, the plurality of quantum kernel-based learners 122 can be trained by the training component 202 for a range of feature maps and Pauli rotation factors. For example, the feature maps employed by the training component 202 can include one or more predefined feature maps (e.g., predefined ZZ feature maps). In another example, the feature maps employed by the training component 202 can include Pauli evolution feature maps the defined range of Pauli rotation factors. In a further example, the feature maps employed by the training component 202 can include custom feature maps defined by one or more of the boosting procedure parameters (e.g., set by the one or more input devices 106). For instance, the training component 202 can employ Pauli evolution feature maps with the following list of choices {"I", "X", "Y", "Z", "XX", "XY", "YY", "YZ", "ZZ"}, which can be extended to other feature map families implementable on quantum circuits of the one or more quantum computers 108 operating on superconducting qubits. Further, the Pauli rotation factor can be any real valued number. For instance, the training component 202 can introduce a grid of Pauli rotation factor values (e.g., between 0.1 and 10).

Additionally, at each iteration of the boosting procedure, the testing component 204 can test the performance of the trained plurality of quantum kernel-based learners 122. For a given iteration of the boosting procedure, the testing component 204 can test the plurality of quantum kernel-based learners 122 having been trained by the training component 202 for the given iteration. In various embodiments, the testing component 204 can test the trained plurality of quantum kernel-based learners 122 on the one or more testing datasets and generate a performance metric characterizing the performance of each quantum kernel-based learner 122. The performance metric can vary based on the type of machine learning task the plurality of quantum kernel-based learners 122 are having been trained to complete. For example, with regards to classification machine learning tasks, the testing component 204 can utilize metrics such accuracy, recall, area under the curve ("AUC"), capture rate, and/or the like as the performance metric for testing the plurality of quantum kernel-based learners 122. In another example, with regards to regression machine learning tasks, the testing component 204 can utilize metrics such as root-mean-square error ("RMSE"), mean squared error ("MSE"), mean absolute error ("MAE"), R-squared, and/or the like as the performance metric for testing the plurality of quantum kernel-based learners 122.

In various embodiments, the ensemble component 110 can select a quantum kernel and associate quantum kernel-based learner 122 with each iteration of the boosting procedure based on the performance metrics generated by the testing component 204. For example, with each iteration of the boosting procedure, the quantum kernel and associate quantum kernel-based learner 122 having the best performance metric for the given machine learning task can be selected by the ensemble component 110. For instance, with regards to classification machine learning tasks, the ensemble component 110 can select a quantum kernel and associate quantum kernel-based learner 122 having the highest accuracy at each iteration of the boosting procedure.

Figure 3:
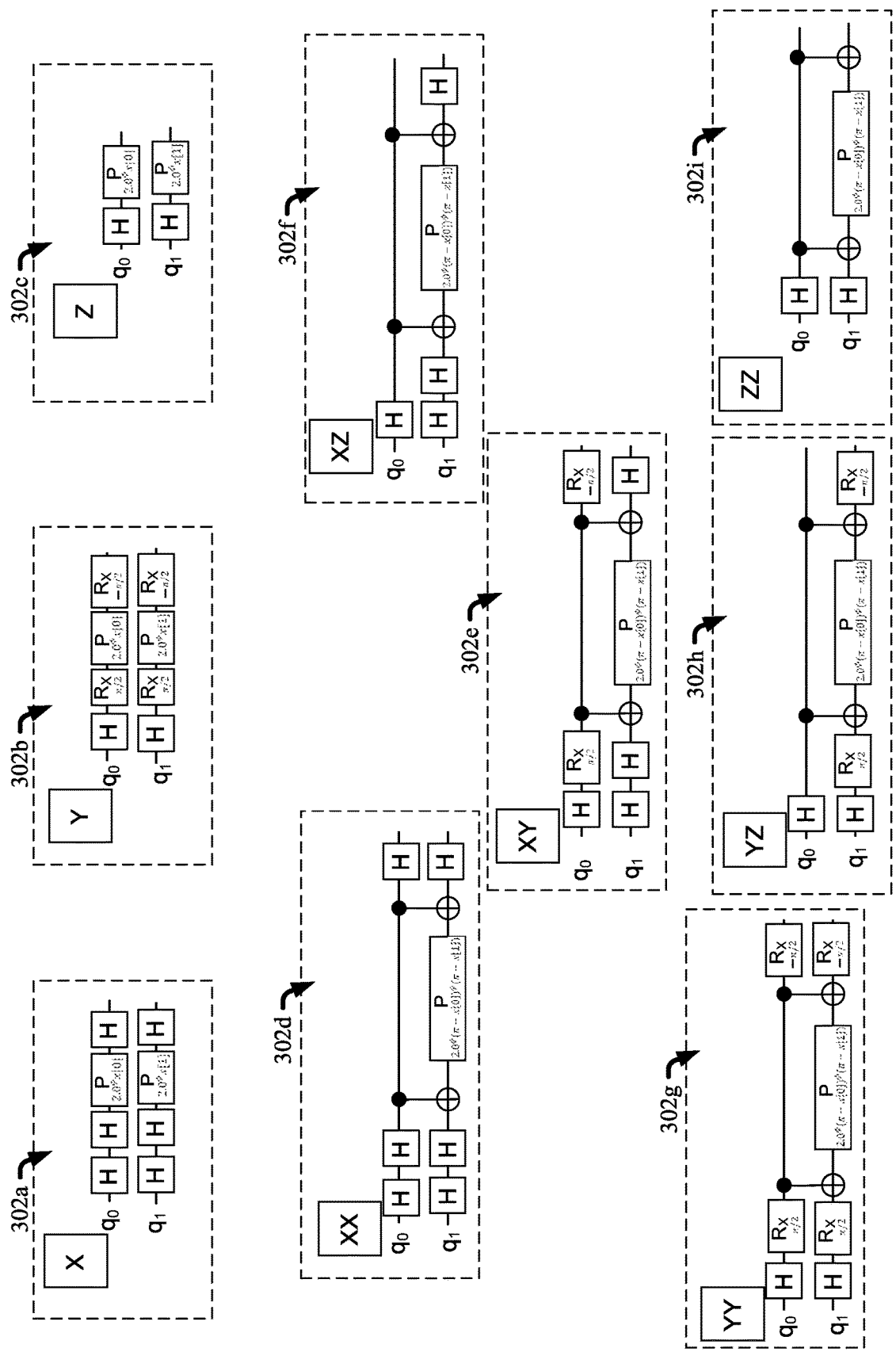
FIG. 3 illustrates a diagram of example, non-limiting feature maps that can be explored by one or more boosting procedures to generate a feature space for one or more quantum machine learning models in accordance with one or more embodiments described herein.

FIG. 3 illustrates a diagram of example non-limiting feature maps 302a-i that can be implemented by the plurality of quantum kernel-based learners 122 during training and/or testing by the training component 202 and/or testing component 204 in accordance with one or more embodiments described herein. Repetitive description of like elements employed in other embodiments described herein is omitted for the sake of brevity. As shown in FIG. 3, the one or more feature maps can delineate one or more qubit connections, qubit entanglements, and/or quantum gates to be employed by respective quantum kernel-based learners 122. For example, "$q_0$" and/or "$q_1$" can represent respective superconducting qubits, "H" blocks can represent Hadamard gates, "$R_X$" blocks can represent quantum gates with x-axis rotation (e.g., including multiplexed quantum gates), "P" blocks can represent P-phase gates, and/or "●─⊕" can represent a CNOT quantum gate.

The feature maps 302a-i depicted in FIG. 3 are illustrated to exemplify the types of feature maps that can be employed by the ensemble component 110. Other types of feature map families and/or compositions are also envisaged in accordance with the various embodiments described herein. Additionally, a range of Pauli rotation factor values (e.g., defined via the one or more input devices 106) can be implemented in conjunction with the exemplary feature maps 302a-i. In various embodiments, a plurality of quantum kernels can define various permutations of the feature maps (e.g., as exemplified in feature maps 302a-i) and Pauli rotation factor values. Further, the training component 202 can train respective quantum kernel-based learners 122 with respective quantum kernels during the plurality of iterations of the boosting procedure.

Figure 4:
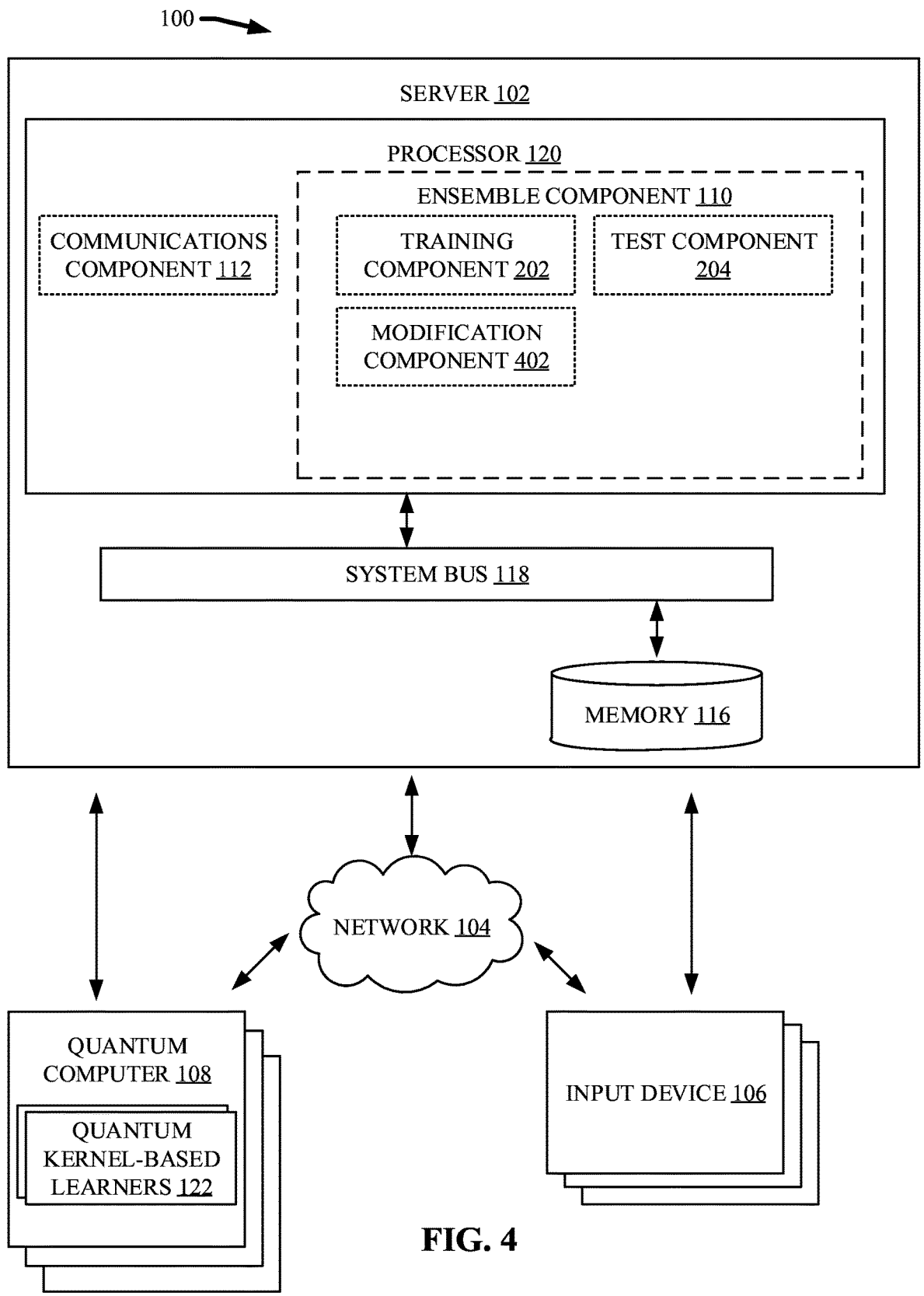
FIG. 4 illustrates a block diagram of an example, non-limiting system that can modify a quantum kernel search with each iteration of a boosting procedure to generate a feature space for one or more quantum machine learning models in accordance with one or more embodiments described herein.

FIG. 4 illustrates a diagram of the example, non-limiting system 100 further comprising modification component 402 in accordance with one or more embodiments described herein. Repetitive description of like elements employed in other embodiments described herein is omitted for the sake of brevity. In various embodiments, the modification component 402 can modify the quantum kernel search for each iteration of the boosting procedure.

For example, at each iteration of the boosting procedure, the modification component 402 can analyze the performance metrics generated by the testing component 204. Based on the performance metrics, the modification component 402 can select one of the quantum kernel-based learners 122 as the top performing quantum kernel-based learner 122 for the iteration. For instance, where the performance metric characterizes accuracy of the quantum kernel-based learners 122 on the testing dataset, the modification component 402 can select the most accurate quantum kernel-based learner 122 of the iteration based on the generated performance metrics.

Additionally, the modification component 402 can exclude the quantum kernel associated with the selected quantum kernel-based learner 122 from the plurality of quantum kernels available for training and/or testing during the subsequent iterations of the boosting procedure. For instance, where a first quantum kernel is selected as a result of a first iteration of the boosting procedure, modification component 402 can exclude the first quantum kernel from the training and/or testing performed during the second iteration of the boosting process. Likewise, where a second quantum kernel is selected during the second iteration of the boosting procedure, the first and second quantum kernels can be excluded (e.g., via the modification component 402) from the training and/or testing performed during the third iteration. By excluding the top performing quantum kernels of previous iterations of the boosting procedure, the modification component 402 can enable the ensemble component 110 to explore wider feature spaces for the one or more quantum machine learning models to be generated using the ensemble of quantum kernel-based learners 122.

Figure 5:
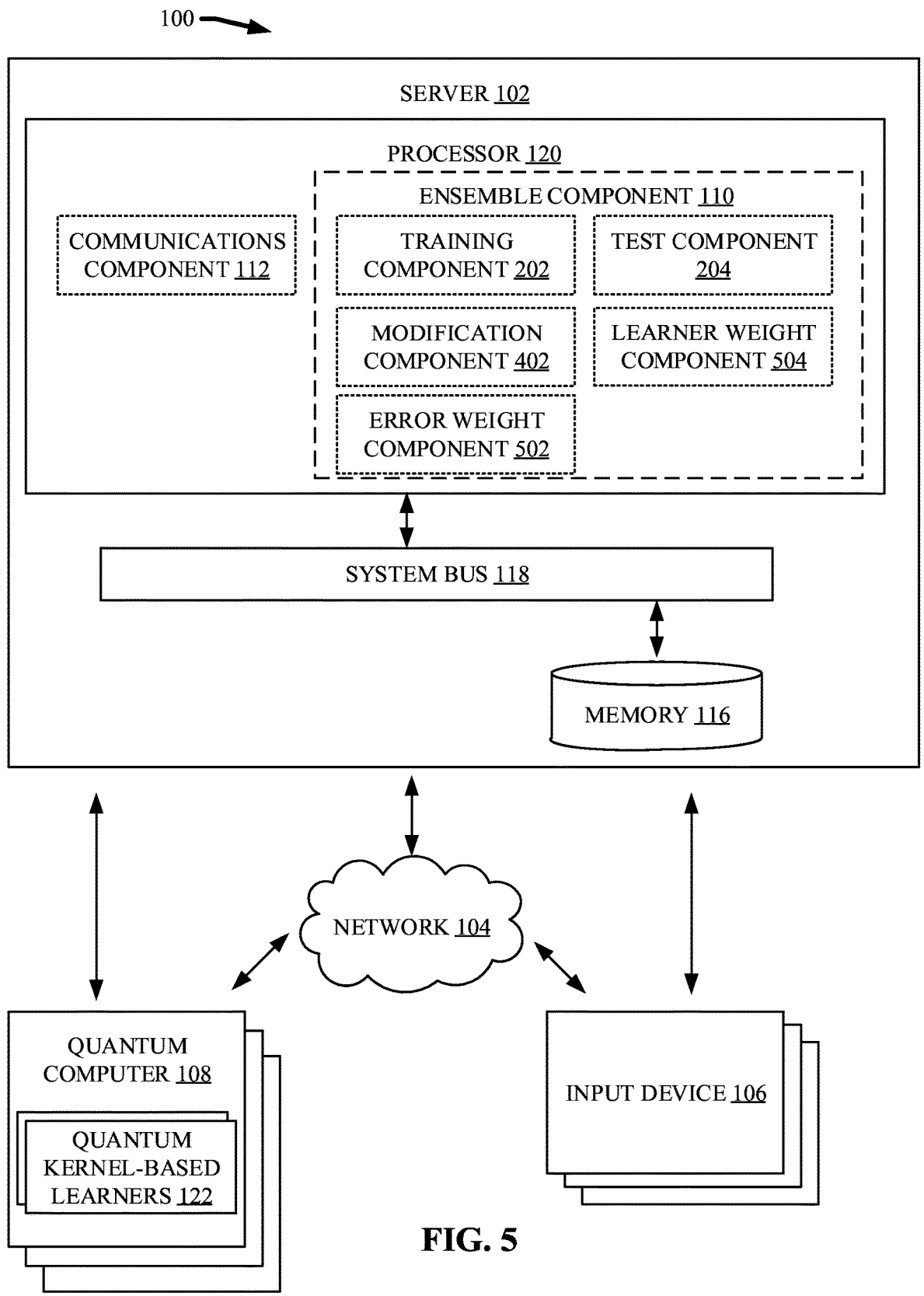
FIG. 5 illustrates a block diagram of an example, non-limiting system that can adjust weight values associated with model error and/or learner performance with each iteration of a boosting procedure to generate a feature space for one or more quantum machine learning models in accordance with one or more embodiments described herein.

FIG. 5 illustrates a diagram of the example, non-limiting system 100 further comprising error weight component 502 and/or learner weight component 504 in accordance with one or more embodiments described herein. Repetitive description of like elements employed in other embodiments described herein is omitted for the sake of brevity. In various embodiments, the error weight component 502 can adjust the weight values associated with the samples of the training datasets based on errors incurred by the plurality of quantum kernel-based learners 122. In various embodiments, the learner weight component 504 can adjust a learner weight associated with the quantum kernel-based learner 122 selected in the given iteration of the generated performance metrics.

In one or more embodiments, the error weight component 502 can adject the weight values of the samples of the training dataset based on the occurrence of errors during the training of the plurality of quantum kernel-based learners 122. In one or more embodiments, the error weight component 502 can adjust the weight values such that samples associated with errors during the training are prioritized during training in subsequent iterations of the boosting procedure. In various embodiments, the error weight component 502 can adjust the sample weights based on the prior weight of the sample. For example, the weight of a training dataset sample can be increased by the error weight component 502 based on the given sample being associated with one or more errors during the quantum kernel-based learner 122 training for the given iteration. Thereby, the given sample can be prioritized during the training of the next iteration (e.g., the given sample can have a higher weight value during the training of the quantum kernel-based learners 122 of the next iteration of the boosting procedure). In another example, the weight of a training dataset sample can be decreased by the error weight component 502 based on the given sample being associated with one or more correct predictions during the quantum kernel-based learner 122 training for the given iteration. In some embodiments, the error weight component 502 can simulate the sample weights by oversampling the training dataset.

In one or more embodiments, the learner weight component 504 can calculate and/or assign a weight value to the quantum kernel-based learner 122 based on the performance metrics generated by the testing component 204. For example, the learner weight component 504 can assign higher weight values to higher performing quantum kernel-based learners 122. In various embodiments, the learner weight component 504 can assign a weight value to the top performing quantum kernel-based learner 122 with each iteration of the boosting procedure. For example, when assigning a weighted value to the quantum kernel-based learners 122 trained and/or tested during a given iteration of the boosting procedure, the learner weight component 504 can assign the largest value of the assigned weighted values to the quantum kernel-based learner 122 having achieved the best performance metric (e.g., in relation to the given machine learning task) amongst the iterations of the boosting procedure.

In various embodiments, the boosting procedure employed by the ensemble component 110 can iterate a number of times until a termination event occurs. Example termination events can include, but are not limited to: the selection of a maximum number of quantum kernel-based learners 122 (e.g., as defined via the one or more input devices 106); the top performing quantum kernel-based learner 122 for a given iteration achieves a performance metric that is less than a defined threshold (e.g., as defined via the one or more input devices 106), such as an accuracy value below 50%; and/or the top performing quantum kernel-based learner 122 for a given iteration achieves a performance metric equal to a defined threshold (e.g., as defined via the one or input devices), such as accuracy value of 100%.

Subsequent to the final iteration of the boosting procedure, the ensemble component 110 can combine the top performing quantum kernel-based leaners 122 (e.g., selected by the modification component 402 at each iteration of the boosting procedure) to generate an ensemble of quantum kernel-based learners 122. Further, each of the top performing quantum kernel-based learners 122 can have an associate weight value (e.g., assigned by the learner weight component 504) within the ensemble.

Figure 6:
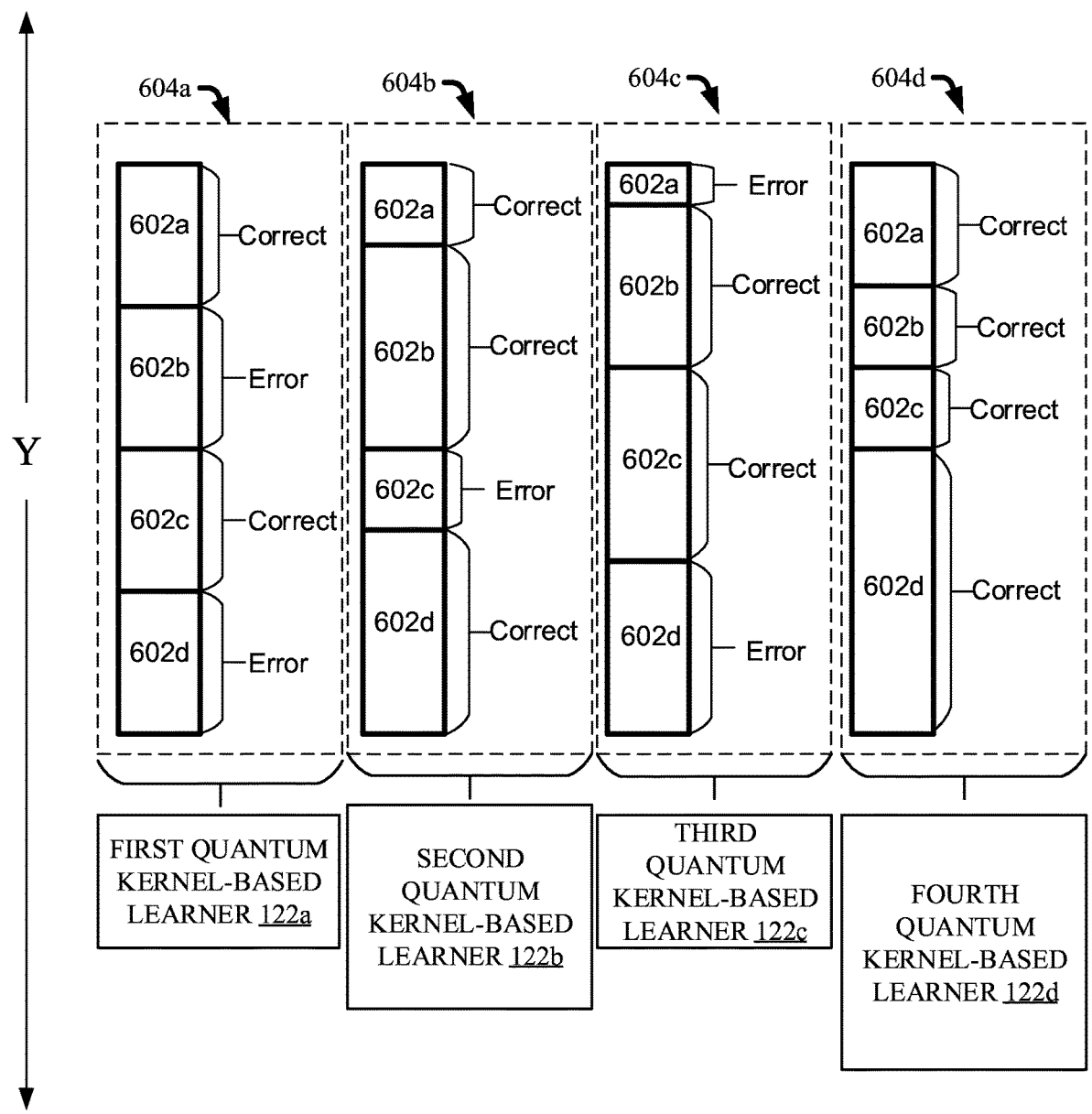
FIG. 6 illustrates a diagram of an example, non-limiting error scheme that can characterize the adjustment of error weight values associated with a training dataset during a boosting procedure to generate a feature space for one or more quantum machine learning models in accordance with one or more embodiments described herein.

FIG. 6 illustrates a diagram of example, non-limiting weight value determinations that can be performed by the error weight component 502 and/or the learner weight component 504 in accordance with one or more embodiments described herein. Repetitive description of like elements employed in other embodiments described herein is omitted for the sake of brevity. FIG. 6 can depict weight determinations with regards to samples of a training dataset used by the training component 202 to train the plurality of quantum kernel-based learners through multiple iterations of the boosting procedure. The example training dataset samples can include a first sample 602a, a second sample 602b, a third sample 602c, and/or a fourth sample 602d. The example trained quantum kernel-based learners 122 depicted in FIG. 6 can include a first quantum kernel-based learner 122a, a second quantum kernel-based learner 122b, a third quantum kernel-based learner 122c, and/or a fourth quantum kernel-based learner 122d. Further, the example weight determinations illustrated in FIG. 6 are conducting over four iterations of the boosting procedure: a first iteration 604a, a second iteration 604b, a third iteration 604c, and/or a fourth iteration 604d. Additionally, the "Y" axis shown in FIG. 6 can represent the value of the weight values (e.g., the sample weights and/or the learner weights). The longer the length of the training dataset sample and/or quantum kernel-based learner 122 along the "Y" axis, the greater the associate weight value.

During the first iteration 604a of the boosting procedure, the plurality of quantum kernel-based learners 122 can be trained by the training component 202 on the first sample 602a, second sample 602b, third sample 602c, and/or fourth sample 602d. Once trained, the testing component 204 can test the plurality of quantum kernel-based learners 122 on the training dataset and generate one or more performance metrics characterizing the performance of the quantum kernel-based learners 122. Where the first quantum kernel-based learner 122a achieves the best performance metric, the modification component 402 can select as the first quantum kernel-based learner 122a as the top performing quantum kernel-based learner 122 for the first iteration 604a.

As shown in FIG. 6, each of the training dataset samples can have equal sample weight values during the first iteration 604a of the boosting procedure (e.g., as delineated by equal lengths along the "Y" axis). Resulting from the training during the first iteration 604a, the first quantum kernel-based learner 122a correctly analyzed the first sample 602a and the third sample 602c (e.g., accurately classified the first sample 602a and third sample 602c in a classification task), but errored in analyzing the second sample 602b and the fourth sample 602d (e.g., misclassified the second sample 602b and the fourth sample 602d in a classification task). Prior to the start of the second iteration 604b, the error weight component 502 can adjust the weight values of the samples to increase the weights of the second sample 602b and the fourth sample 602d (e.g., the samples associated with the error analyses). Further, based on the performance metric of the first quantum kernel-based learner 122a, the learner weight component 504 can assign a weight value to the first quantum kernel-based learner 122a. Additionally, the modification component 402 can exclude the first quantum kernel-based learner 122a, and thereby the associate quantum kernel, selected from the first iteration 604a from the second iteration 604b, third iteration 604c, and/or fourth iteration 604d.

During the second iteration 604b, the plurality of quantum kernel-based learners 122, absent the first quantum kernel-based learner 122a, can be trained by the training component 202 on the first sample 602a, second sample 602b, third sample 602c, and/or fourth sample 602d. Once trained, the testing component 204 can test the plurality of quantum kernel-based learners 122 on the training dataset and generate one or more performance metrics characterizing the performance of the quantum kernel-based learners 122. Where the second quantum kernel-based learner 122b achieves the best performance metric for the second iteration 604b, the modification component 402 can select as the second quantum kernel-based learner 122b as the top performing quantum kernel-based learner 122 for the second iteration 604b.

As shown in FIG. 6, the training during the second iteration 604b can be performed with adjusted sample weights (e.g., where the weights of the second sample 602b and the fourth sample 602d are increased in comparison to their respective weights in the first iteration 604a). Resulting from the training during the second iteration 604b, the second quantum kernel-based learner 122b correctly analyzed the first sample 602a, the second sample 602b, and the fourth sample 602d, but errored in analyzing the third sample 602c. Prior to the start of the third iteration 604c, the error weight component 502 can adjust the weight values of the samples to increase the weight of the third sample 602c (e.g., the sample associated with the error analysis in the second iteration 604b). Further, based on the performance metric of the second quantum kernel-based learner 122b, the learner weight component 504 can assign a weight value to the second quantum kernel-based learner 122b. As shown in FIG. 6, since the second quantum kernel-based learner 122b analyzed more training dataset samples correctly than the first quantum kernel-based learner 122a, the learner weight component 504 can assign a larger weight value to the second quantum kernel-based learner 122b than the first quantum kernel-based learner 122a. Additionally, the modification component 402 can further exclude the second quantum kernel-based learner 122b, and thereby the associate quantum kernel, selected from the second iteration 604b from the third iteration 604c and/or fourth iteration 604d.

During the third iteration 604c, the plurality of quantum kernel-based learners 122, absent the first quantum kernel-based learner 122a and second quantum kernel-based learner 122b, can be trained by the training component 202 on the first sample 602a, second sample 602b, third sample 602c, and/or fourth sample 602d. Once trained, the testing component 204 can test the plurality of quantum kernel-based learners 122 on the training dataset and generate one or more performance metrics characterizing the performance of the quantum kernel-based learners 122. Where the third quantum kernel-based learner 122c achieves the best performance metric for the third iteration 604c, the modification component 402 can select as the third quantum kernel-based learner 122c as the top performing quantum kernel-based learner 122 for the third iteration 604c.

As shown in FIG. 6, the training during the third iteration 604c can be performed with adjusted sample weights (e.g., where the weights of the third sample 602c is increased in comparison to its weight in the second iteration 604b). Resulting from the training during the third iteration 604c, the third quantum kernel-based learner 122c correctly analyzed the second sample 602b, and the third sample 602c, but errored in analyzing the first sample 602a and the fourth sample 602d. Prior to the start of the fourth iteration 604d, the error weight component 502 can adjust the weight values of the samples to increase the weight of the first sample 602a and the fourth sample 602d (e.g., the samples associated with the error analyses in the third iteration 604c). Further, based on the performance metric of the third quantum kernel-based learner 122c, the learner weight component 504 can assign a weight value to the third quantum kernel-based learner 122c. As shown in FIG. 6, since the third quantum kernel-based learner 122c analyzed the same number of training dataset samples correctly as the first quantum kernel-based learner 122a, the learner weight component 504 can assign the same weight value to the third quantum kernel-based learner 122c as the first quantum kernel-based learner 122a. Additionally, the modification component 402 can further exclude the third quantum kernel-based learner 122c, and thereby the associate quantum kernel, selected from the third iteration 604c from the fourth iteration 604d.

During the fourth iteration 604d, the plurality of quantum kernel-based learners 122, absent the first quantum kernel-based learner 122a, the second quantum kernel-based learner 122b, and the third quantum kernel-based learner 122c, can be trained by the training component 202 on the first sample 602a, second sample 602b, third sample 602c, and/or fourth sample 602d. Once trained, the testing component 204 can test the plurality of quantum kernel-based learners 122 on the training dataset and generate one or more performance metrics characterizing the performance of the quantum kernel-based learners 122. Where the fourth quantum kernel-based learner 122d achieves the best performance metric for the fourth iteration 604d, the modification component 402 can select as the fourth quantum kernel-based learner 122d as the top performing quantum kernel-based learner 122 for the fourth iteration 604d.

As shown in FIG. 6, the training during the fourth iteration 604d can be performed with adjusted sample weights (e.g., where the weights of the first sample 602a and the fourth sample 602d are increased in comparison to their respective weights in the third iteration 604c). Resulting from the training during the fourth iteration 604d, the fourth quantum kernel-based learner 122d correctly analyzed the first sample 602a, the second sample 602b, the third sample 602c, and the fourth sample 602d. Further, based on the performance metric of the fourth quantum kernel-based learner 122d, the learner weight component 504 can assign a weight value to the fourth quantum kernel-based learner 122d. As shown in FIG. 6, since the fourth quantum kernel-based learner 122d analyzed more training dataset samples correctly than the first quantum kernel-based learner 122a, second quantum kernel based learner 122b, and/or third quantum kernel-based learner 122c, the learner weight component 504 can assign the greatest weight value to the fourth quantum kernel-based learner 122d. Further, the ensemble component 110 can cease iterations of the boosting procedure based on a quantum kernel-based learner 122 correctly analyzing all the samples of the training dataset.

FIG. 7 illustrates an example, non-limiting algorithm 700 that can be employed by the ensemble component 110 to implement a boosting procedure and generate an ensemble of quantum kernel-based learners 122 in accordance with one or more embodiments described herein. Repetitive description of like elements employed in other embodiments described herein is omitted for the sake of brevity. For example, the algorithm 700 can be employed to generate an ensemble of quantum kernel-based learners 122 (e.g., quantum classifiers) for a QSVM model.

As shown in FIG. 7, "$X_{train}$" can represent the training dataset, "$y_{train}$" can represent a dependent variable for the training dataset, "M" can represent a maximum number of quantum kernel-based learners 122 to be included in the ensemble (e.g., defined via the one or more input devices 106), "i" can represent an index of the training dataset, "j" can represent an index of the Pauli rotation factors grid, "α" can represent a Pauli rotation factor, and/or "G(x)" can be the ensemble generated by the ensemble component 110. For example, the fitting the classifiers at action 3 of the algorithm 700 can be performed by the training component 202 and/r the testing component 204 in accordance with the various embodiments described herein. Choosing the best classifier at action 4 of the algorithm 700 can be performed by the modification component 402 in accordance with the various embodiments described herein. At action 5 of the algorithm 700, one or more errors performed by the trained quantum kernel-based learners 122 (e.g., quantum classifiers) can be computed (e.g., represented by ("$err_m$") by the error weight component 502 in accordance with the various embodiments described herein. At action 6, "$α_m$" can represent the learner weights, which can be computed by the learner weight component 504 in accordance with the various embodiments described herein. At action 7, sample weights "$w_i$," of the training dataset can be adjusted by the error weight component 502 in accordance with the various embodiments described herein. At action 8, the training dataset and/or testing dataset can be sampled with the adjusted sample weights for the subsequent iteration of the boosting procedure by the training component 202 and/or testing component 204 in accordance with various embodiments described herein. At action 9, the ensemble component 110 can combine the best performing quantum kernel-based learners 122 (e.g., quantum classifiers that achieved the best performance metrics) to form an ensemble that incorporates the assigned learner weights in accordance with various embodiments described herein.

Figure 8:
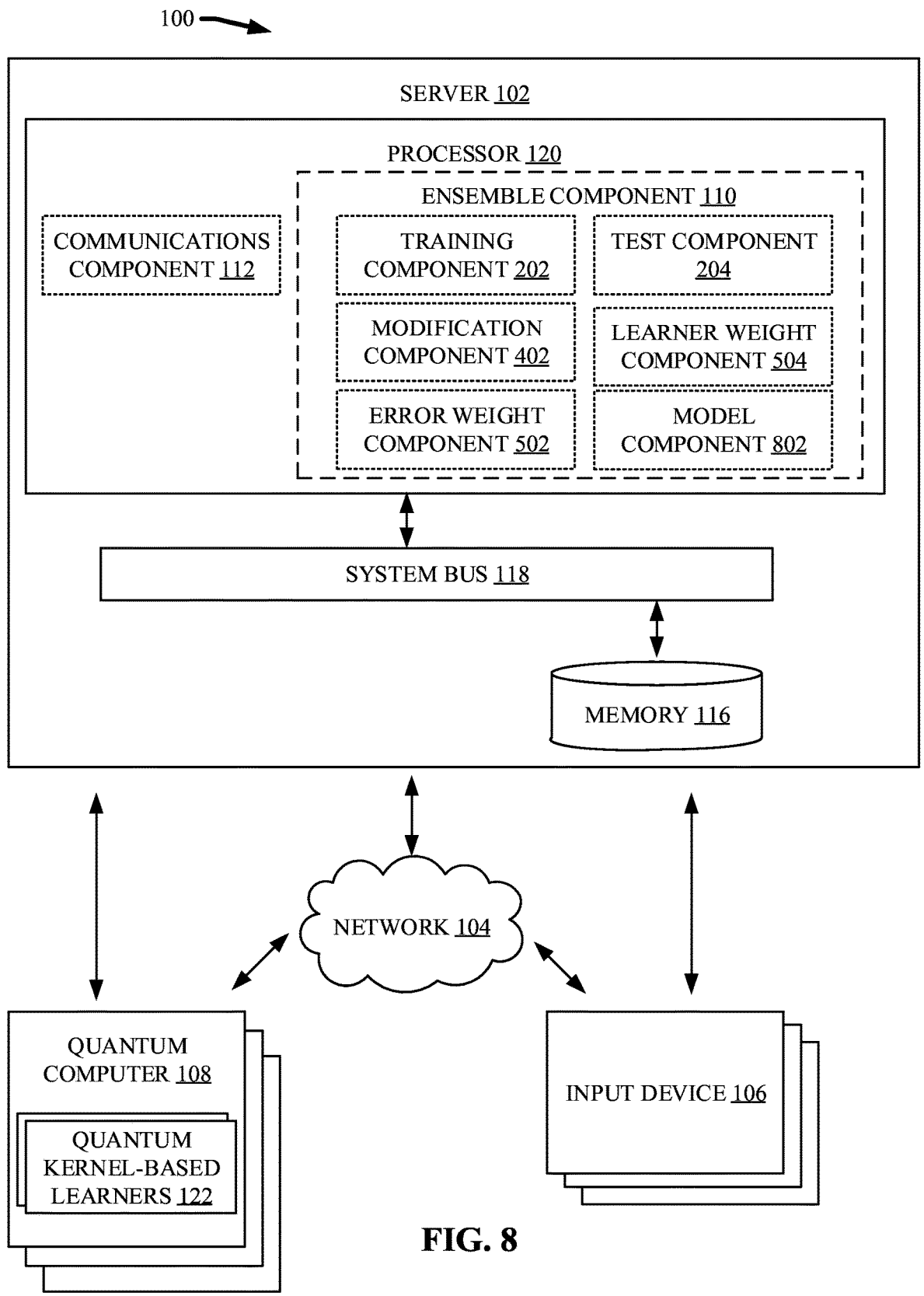
FIG. 8 illustrates a diagram of an example, non-limiting system that can employ a generated ensemble of quantum kernel-based learners to execute one or more machine learning models in accordance with one or more embodiments described herein.

FIG. 8 illustrates a diagram of the example, non-limiting system 100 further comprising model component 802 in accordance with one or more embodiments described herein. Repetitive description of like elements employed in other embodiments described herein is omitted for the sake of brevity. In various embodiments, the model component 802 can implement one or more quantum machine learning models using the generated ensemble of quantum kernel-based learners 122.

In one or more embodiments, the model component 802 can further generate one or more reports regarding the training and/or performance behavior of the quantum kernel-based learners 122 comprised within the ensemble and/or the quantum machine learning model. For example, the one or more reports generated by the model component 802 can indicate an optimal number of quantum kernel-based learners 122 to be employed in the quantum machine learning model to avoid overfitting. For instance, overfitting can be detected by the model component 802 by identifying when the training error continues to decrease as new quantum kernel-based learners 122 are added while the testing error starts to increase. In one or more embodiments, the quantum machine learning model can be represented as a binary object that can be used to build predicts for new sample datasets. Additionally, in some embodiments the model component 802 can combine the quantum machine learning model implemented via the ensemble of quantum kernel-based learners 122 with other machine learning models (e.g., other quantum machine learning models and/or classical computing machine learning models).

Figure 9:
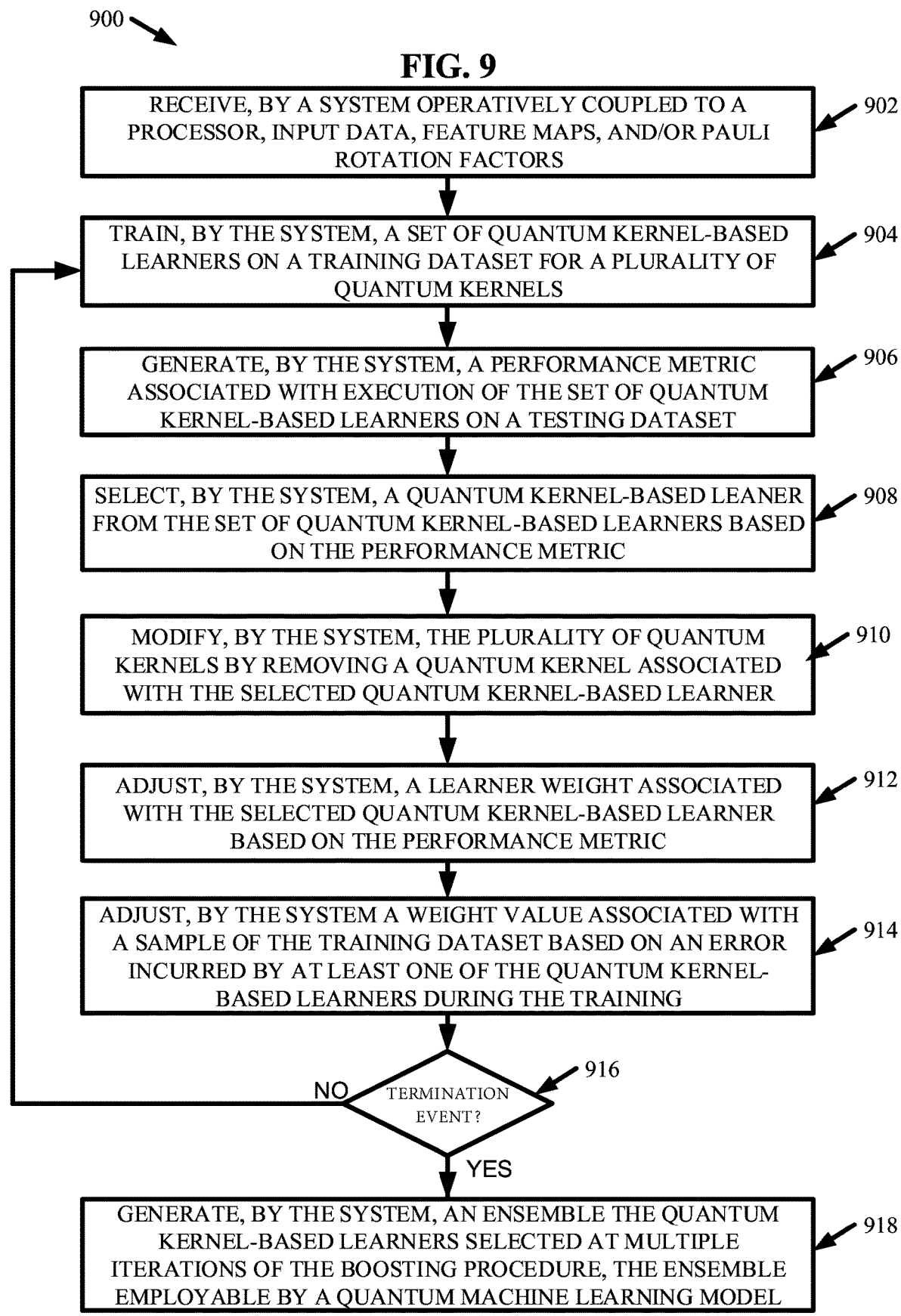
FIG. 9 illustrates a flow diagram of an example, non-limiting computer-implemented method that can be employed by one or more systems to generate an ensemble of quantum kernel-based learners for generating a feature space of one or more quantum machine learning models in accordance with one or more embodiments described herein.

FIG. 9 illustrates a flow diagram of an example, non-limiting computer-implemented method 900 that can generate an ensemble of quantum kernel-based learners 122 via a boosting procedure that can explore a wide range of feature maps employable by one or more quantum machine learning models in accordance with one or more embodiments described herein. Repetitive description of like elements employed in other embodiments described herein is omitted for the sake of brevity.

At 902, the computer-implemented method 900 can comprise receiving (e.g., via communications component 112), by a system 100 operatively coupled to a processor 120, input data, feature maps, and/or Pauli rotation factors. As described herein, one or more input devices 106 can be employed to enter input data that can be processed and/or split into one or more training datasets and/or testing datasets that can be analyzed by one or more quantum computers 108. At 904, the computer-implemented method 900 can comprise training (e.g., via training component 202), by the system 100, a set of quantum kernel-based learners 122 on one or more training datasets for a plurality of quantum kernels. For example, the plurality of quantum kernels can define permutations of feature maps and Pauli rotation factors that can be explored to generate a feature space for one or more quantum machine learning models.

At 906, the computer-implemented method 900 can comprise generating (e.g., via testing component 204), by the system 100, one or more performance metrics associated with execution of the set of quantum kernel-based learners 122 on one or more testing datasets. For example, the one or more performance metrics can characterize the performance of the quantum kernel-based learners 122 in performing one or more machine learning tasks after being trained at 904. At 908, the computer-implemented method 900 can comprise selecting (e.g., via modification component 402), by the system 100, a quantum kernel-based learner 122 from the set of quantum kernel-based learners 122 based on the one or more performance metrics. For example, the quantum kernel-based learner selected at 908 can be the best performing quantum kernel-based learner 122 on the training dataset, as characterized by the generated performance metrics.

At 910, the computer-implemented method 900 can comprise modifying (e.g., via modification component 402), by the system 100, the plurality of quantum kernels by removing a quantum kernel associated with the selected quantum kernel-based learner 122 from the plurality of possible quantum kernels to be explored via subsequent training and/or testing of the quantum kernel-based learners 122. At 912, the computer-implemented method 900 can comprise adjusting (e.g., via learner weight component 504), by the system 100, a learner weight associated with the selected quantum kernel-based learner 122 based on the performance metric. For example, greater the selected quantum kernel-based leaner 122 performed on the training and/or testing datasets, the greater the weight value assigned to the selected quantum kernel-based learner 122. At 914, the computer-implemented method 900 can comprise adjusting (e.g., via error weight component 502), by the system 100, a weight value associated with one or more samples of the training dataset based on one or more errors incurred by at least one of the quantum kernel-based learners 122 during the training at 904. For example, the weight value associated with training dataset samples associated with errors during the training at 904 can be increased to prioritize the samples for subsequent training iterations.

At 916, the computer-implemented method 900 can determine whether a termination event has occurred. In various embodiments, the features performed from 904 to 914 can comprise a boosting procedure employable (e.g., via ensemble component 110) to generate an ensemble of quantum kernel-based learners 122. A termination event can be indicative of whether the to reiterate the boosting procedure or terminate the boosting procedure and proceed with next stage of the computer-implemented method 900. Example termination events can include, but are not limited to: the selection of a maximum number of quantum kernel-based learners 122 (e.g., as defined via the one or more input devices 106); the top performing quantum kernel-based learner 122 for a given iteration achieves a performance metric that is less than a defined threshold (e.g., as defined via the one or more input devices 106), such as an accuracy value below 50%; and/or the top performing quantum kernel-based learner 122 for a given iteration achieves a performance metric equal to a defined threshold (e.g., as defined via the one or input devices), such as accuracy value of 100%.

Where a termination event has not occurred, the computer-implemented method 900 can proceed to 904 to perform another iteration of the boosting procedure. Where a termination event has occurred, the computer-implemented method 900 can proceed to 918. At 918, the computer-implemented method 900 can comprise generating (e.g., via ensemble component 110), by the system 100, one or more ensembles of the quantum kernel-based learners 122 selected at multiple iterations of the boosting procedure. The ensemble of quantum kernel-based learners 122 can be employable by one or more quantum machine learning models to perform one or more machine learning tasks, such as classification and/or regression tasks.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
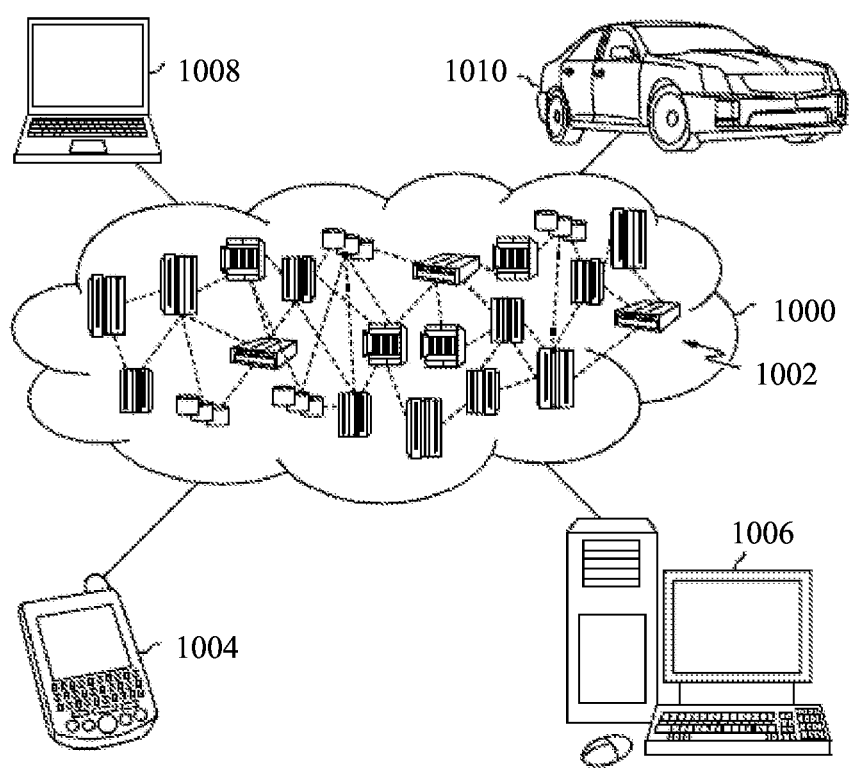
FIG. 10 depicts a cloud computing environment in accordance with one or more embodiments described herein.

Referring now to FIG. 10, illustrative cloud computing environment 1000 is depicted. As shown, cloud computing environment 1000 includes one or more cloud computing nodes 1002 with which local computing devices used by cloud consumers, such as, for example, personal digital assistant (PDA) or cellular telephone 1004, desktop computer 1006, laptop computer 1008, and/or automobile computer system 1010 may communicate. Nodes 1002 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1004-1010 shown in FIG. 10 are intended to be illustrative only and that computing nodes 1002 and cloud computing environment 1000 can communicate with any type of computerized device over any type of network and/or network addressable connection (e.g., using a web browser).

Figure 11:
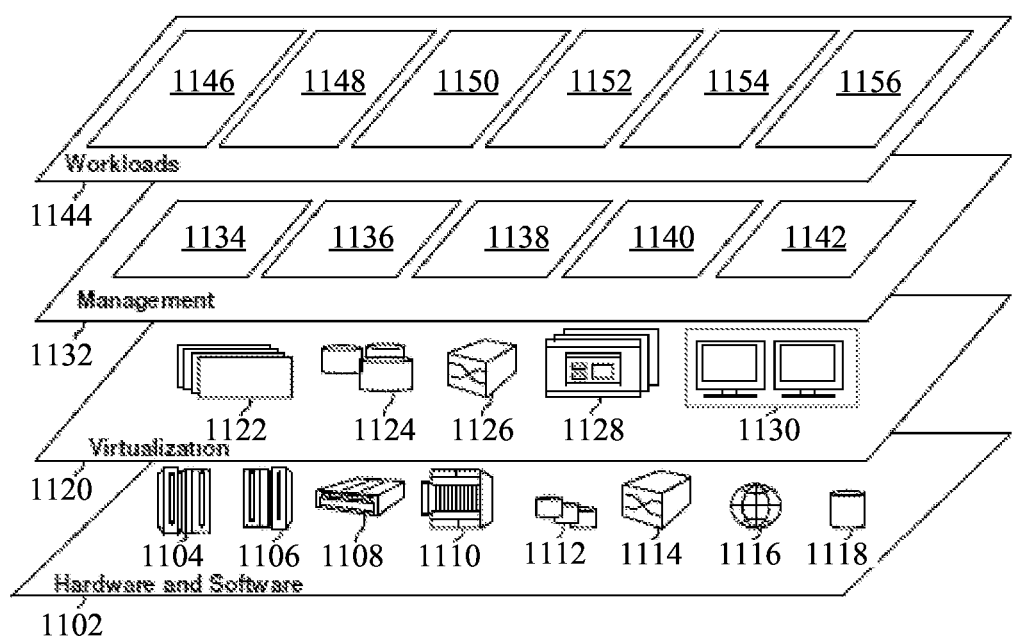
FIG. 11 depicts abstraction model layers in accordance with one or more embodiments described herein

Referring now to FIG. 11, a set of functional abstraction layers provided by cloud computing environment 1000 (FIG. 10) is shown. Repetitive description of like elements employed in other embodiments described herein is omitted for the sake of brevity. It should be understood in advance that the components, layers, and functions shown in FIG. 11 are intended to be illustrative only and embodiments of the invention are not limited thereto. As depicted, the following layers and corresponding functions are provided.

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and learner ensemble generation 1156. Various embodiments of the present invention can utilize the cloud computing environment described with reference to FIGS. 10 and 11 to control the one or more quantum computers 108, implement the boosting procedure described herein, and/or combine quantum kernel-based learners 122 to generate an ensemble employable by one or more quantum machine learning models.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware based systems that perform the specified functions or acts or carry out combinations of special purpose hardware and computer instructions.

Figure 12:
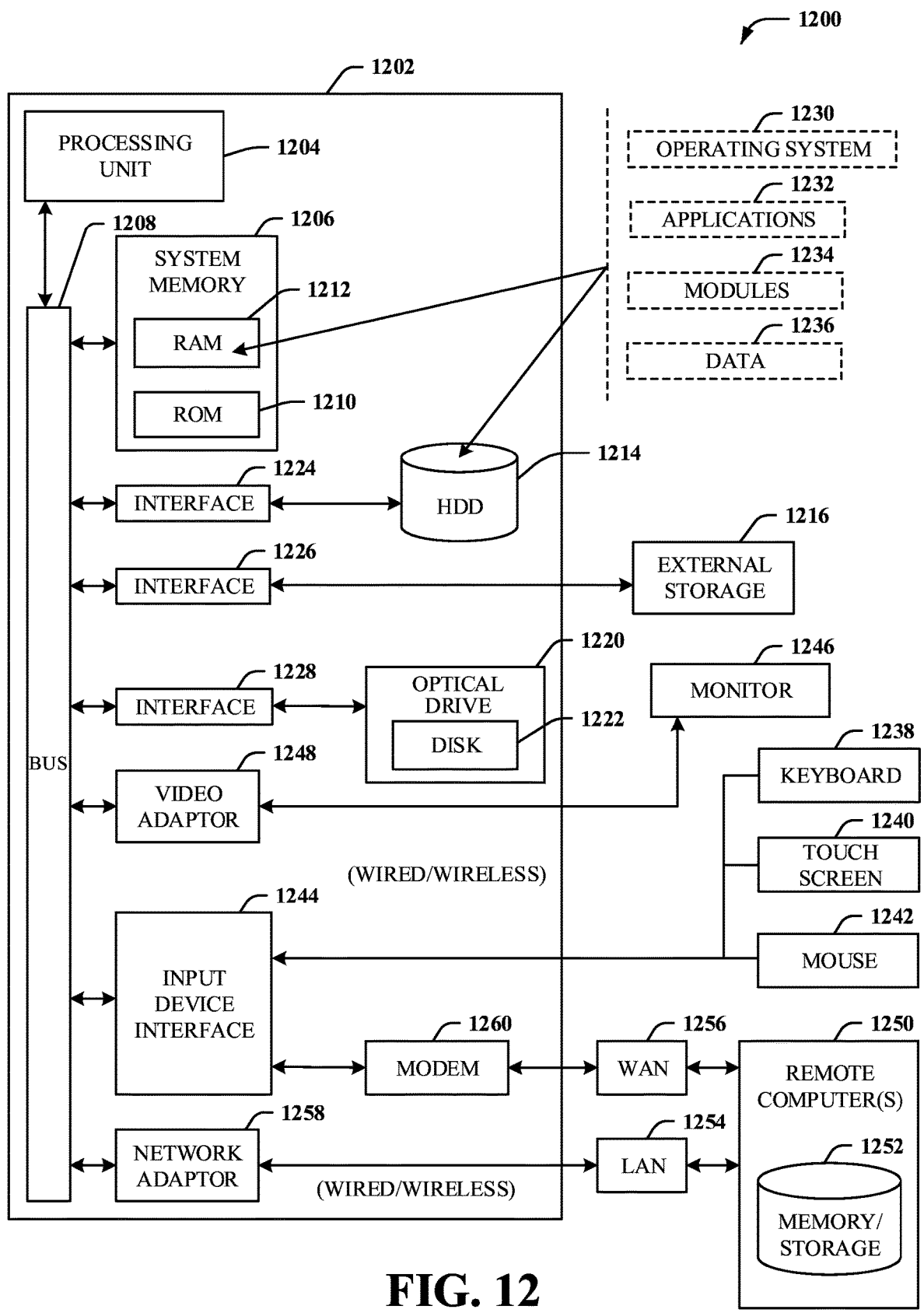
FIG. 12 illustrates a block diagram of an example, non-limiting operating environment in which one or more embodiments described herein can be facilitated.

In order to provide additional context for various embodiments described herein, FIG. 12 and the following discussion are intended to provide a general description of a suitable computing environment 1200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, and/or the like, that perform particular tasks or implement particular abstract data types. Moreover, those skilled in the art will appreciate that the inventive methods can be practiced with other computer system configurations, including single-processor or multi-processor computer systems, minicomputers, mainframe computers, Internet of Things ("IoT") devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices. For example, in one or more embodiments, computer executable components can be executed from memory that can include or be comprised of one or more distributed memory units. As used herein, the term "memory" and "memory unit" are interchangeable. Further, one or more embodiments described herein can execute code of the computer executable components in a distributed manner, e.g., multiple processors combining or working cooperatively to execute code from one or more distributed memory units. As used herein, the term "memory" can encompass a single memory or memory unit at one location or multiple memories or memory units at one or more locations.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory ("RAM"), read only memory ("ROM"), electrically erasable programmable read only memory ("EEPROM"), flash memory or other memory technology, compact disk read only memory ("CD-ROM"), digital versatile disk ("DVD"), Blu-ray disc ("BD") or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system ("BIOS") can be stored in a non-volatile memory such as ROM, erasable programmable read only memory ("EPROM"), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive ("HDD") 1214 (e.g., EIDE, SATA), one or more external storage devices 1216 (e.g., a magnetic floppy disk drive ("FDD") 1216, a memory stick or flash drive reader, a memory card reader, a combination thereof, and/or the like) and an optical disk drive 1220 (e.g., which can read or write from a CD-ROM disc, a DVD, a BD, and/or the like). While the internal HDD 1214 is illustrated as located within the computer 1202, the internal HDD 1214 can also be configured for external use in a suitable chassis (not shown). Additionally, while not shown in environment 1200, a solid state drive ("SSD") could be used in addition to, or in place of, an HDD 1214. The HDD 1214, external storage device(s) 1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus ("USB") and Institute of Electrical and Electronics Engineers ("IEEE") 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine ("VM") of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enable with a security module, such as a trusted processing module ("TPM"). For instance with a TPM, boot components hash next in time boot components, and wait for a match of results to secured values, before loading a next boot component. This process can take place at any layer in the code execution stack of computer 1202, e.g., applied at the application execution level or at the operating system ("OS") kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared ("IR") remote control, a radio frequency ("RF") remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH® interface, and/or the like.

A monitor 1246 or other type of display device can be also connected to the system bus 1208 via an interface, such as a video adapter 1248. In addition to the monitor 1246, a computer typically includes other peripheral output devices (not shown), such as speakers, printers, a combination thereof, and/or the like.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network ("LAN") 1254 and/or larger networks, e.g., a wide area network ("WAN") 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point ("AP") disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, and/or the like), and telephone. This can include Wireless Fidelity ("Wi-Fi") and BLUETOOTH® wireless technologies. Thus, the communication can be a predefined structure as with a conventional network or simply an ad hoc communication between at least two devices.

What has been described above include mere examples of systems, computer program products and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
    a memory that stores computer executable components; and
    a processor, operably coupled to the memory, and that executes the computer executable components stored in the memory, wherein the computer executable components comprise:
        an ensemble component that generates an ensemble of quantum kernel-based learners by selecting a quantum kernel at multiple iterations of a boosting procedure that analyzes a range of feature maps and Pauli rotation factors employable by a quantum machine learning model.

2. The system of claim 1, further comprising:
    a training component that trains a set of quantum kernel-based learners on a training dataset for a plurality of quantum kernels, wherein the plurality of quantum kernels define permutations of the range of feature maps and Pauli rotation factors; and
    a test component that generates a performance metric associated with execution of the set of quantum kernel-based learners on a testing dataset.

3. The system of claim 2, wherein the test component generates the performance metric with each of the multiple iterations, wherein the ensemble component selects the quantum kernel based on the performance metric, and wherein the quantum kernel is associated with a quantum kernel-based learner comprised within the ensemble.

4. The system of claim 2, wherein a first quantum kernel is selected from the plurality of quantum kernels by the ensemble component at a first iteration of the boosting procedure, and wherein the system further comprises:

a modification component that generates a modified plurality of quantum kernels by removing the first quantum kernel from the plurality of quantum kernels based on the first iteration, wherein a second quantum kernel is selected from the modified plurality of quantum kernels at a second iteration of the boosting procedure.

5. The system of claim 4, further comprising:
an error weight component that adjusts a weight value associated with a sample of the training dataset based on an error performed by the at least one quantum kernel-based learner from the set of quantum kernel-based learners during the training performed by the training component; and
a learner weight component that adjusts a learner weight associated with a quantum kernel-based learner from the set of quantum kernel-based learners based on the performance metric.

6. The system of claim 5, wherein error was performed with regards to the sample, and wherein the error weight component increases the weight value.

7. The system of claim 5, wherein the quantum kernel-based learner implemented the first quantum kernel during testing performed by the test component.

8. The system of claim 5, further comprising:
an ensemble component that generates the ensemble of quantum kernel-based learners by combining quantum kernel-based learners associated with the first quantum kernel and the second quantum kernel selected from the multiple iterations of the boosting procedure.

9. The system of claim 8, further comprising:
a model component that implements the quantum machine learning model with the ensemble of quantum kernel-based learners.

10. The system of claim 1, wherein the ensemble of quantum kernel-based learners comprises a plurality of quantum kernel-based learners executable on superconducting qubits.

11. A computer-implemented method, comprising:
generating, by a system operatively coupled to a processor, an ensemble of quantum kernel-based learners by selecting a quantum kernel at multiple iterations of a boosting procedure that analyzes a range of feature maps and Pauli rotation factors employable by a quantum machine learning model.

12. The computer-implemented method of claim 11, further comprising:
training, by the system, a set of quantum kernel-based learners on a training dataset for a plurality of quantum kernels, wherein the plurality of quantum kernels define permutations of the range of feature maps and Pauli rotation factors; and
generating, by the system, a performance metric associated with execution of the set of quantum kernel-based learners on a testing dataset.

13. The computer-implemented method of claim 12, wherein a first quantum kernel is selected from the plurality of quantum kernels at a first iteration of the boosting procedure based on the performance metric, wherein the quantum kernel is associated with a quantum kernel-based learner comprised within the ensemble, and wherein the computer-implemented method further comprises:
generating, by the system, a modified plurality of quantum kernels by removing the first quantum kernel from the plurality of quantum kernels based on the first iteration, wherein a second quantum kernel is selected from the modified plurality of quantum kernels at a second iteration of the boosting procedure.

14. The computer-implemented method of claim 13, further comprising:
adjusting, by the system, a weight value associated with a sample of the training dataset based on an error performed by the at least one quantum kernel-based learner from the set of quantum kernel-based learners during the training; and
adjusting, by the system, a learner weight associated with a quantum kernel-based learner from the set of quantum kernel-based learners based on the performance metric.

15. The computer-implemented method of claim 14, further comprising:
generating, by the system, the ensemble of quantum kernel-based learners by combining quantum kernel-based learners associated with the first quantum kernel and the second quantum kernel selected from the multiple iterations of the boosting procedure.

16. A computer program product for developing a feature space of a quantum machine learning model, the computer program product comprising a computer readable storage medium having program instructions embodied therewith, the program instructions executable by a processor to cause the processor to:
generate, by the processor, an ensemble of quantum kernel-based learners by selecting a quantum kernel at multiple iterations of a boosting procedure that analyzes a range of feature maps and Pauli rotation factors employable by the quantum machine learning model.

17. The computer program product of claim 16, wherein the program instructions further cause the processor to:
train, by the processor, a set of quantum kernel-based learners on a training dataset for a plurality of quantum kernels, wherein the plurality of quantum kernels define permutations of the range of feature maps and Pauli rotation factors; and
generate, by the processor, a performance metric associated with execution of the set of quantum kernel-based learners on a testing dataset.

18. The computer program product of claim 17, wherein a first quantum kernel is selected from the plurality of quantum kernels at a first iteration of the boosting procedure, based on the performance metric, wherein the quantum kernel is associated with a quantum kernel-based learner comprised within the ensemble, and wherein the program instructions further cause the processor to:
generate, by the processor, a modified plurality of quantum kernels by removing the first quantum kernel from the plurality of quantum kernels based on the first iteration, wherein a second quantum kernel is selected from the modified plurality of quantum kernels at a second iteration of the boosting procedure.

19. The computer program product of claim 18, wherein the program instructions further cause the processor to:
adjusting, by the processor, a weight value associated with a sample of the training dataset based on an error performed by the at least one quantum kernel-based learner from the set of quantum kernel-based learners during the training; and
adjusting, by the processor, a learner weight associated with a quantum kernel-based learner from the set of quantum kernel-based learners based on the performance metric.

20. The computer program product of claim 19, wherein the program instructions further cause the processor to:
generate, by the processor, the ensemble of quantum kernel-based learners by combining quantum kernel-based learners associated with the first quantum kernel and the second quantum kernel selected from the multiple iterations of the boosting procedure.

\* \* \* \* \*